United States Patent [19]

Bishop et al.

[11] Patent Number: 4,990,276
[45] Date of Patent: Feb. 5, 1991

[54] MAGNETIC DISPERSION

[75] Inventors: John F. Bishop; Robert O. James, both of Rochester; Diane E. Kestner, Hilton, all of N.Y.

[73] Assignee: Eastman Kodak Company, Rochester, N.Y.

[21] Appl. No.: 473,500

[22] Filed: Feb. 1, 1990

[51] Int. Cl.$^5$ .............................................. H01F 1/28
[52] U.S. Cl. .................................................. 252/62.54
[58] Field of Search ...................................... 252/62.54

[56] References Cited

U.S. PATENT DOCUMENTS

| | | | |
|---|---|---|---|
| 3,595,694 | 7/1971 | Akai et al. | 117/235 |
| 3,634,137 | 1/1972 | Akashi et al. | 117/235 |
| 3,634,253 | 1/1972 | Akashi et al. | 252/62.45 |
| 3,653,962 | 4/1972 | Akashi et al. | 117/240 |
| 3,767,464 | 10/1973 | Akashi et al. | 117/237 |
| 3,782,947 | 1/1974 | Krall | 96/67 |
| 4,279,945 | 7/1981 | Audran et al. | 427/130 |
| 4,677,030 | 6/1987 | Gerom et al. | 428/425.9 |

Primary Examiner—William R. Dixon, Jr.
Assistant Examiner—Alan A. Wright
Attorney, Agent, or Firm—Robert A. Gerlach

[57] ABSTRACT

A dispersion consisting essentially of magnetic particles, a dialkylester of phthalic acid which functions as a dispersing medium, and optionally, a dispersing agent is particularly useful as a precursor to a composition suitable for casting onto a cellulose acid ester support film to form a transparent magnetic recording layer for use in photographic films. The dispersion provides magnetic recording layers exhibiting fewer particle agglomerations and reduced light scattering and photographic prints prepared from films containing such magnetic layers exhibit virtually no increase in graininess attributable to the magnetic recording layer.

7 Claims, No Drawings 4,990,276

MAGNETIC DISPERSION

CROSS REFERENCE TO RELATED APPLICATION

Reference is hereby made to commonly-assigned copending U.S. patent application Ser. No. 473,494, filed Feb. 1, 1990 entitled PHOTOGRAPHIC ELEMENT CONTAINING THIN TRANSPARENT MAGNETIC RECORDING LAYER AND METHOD FOR THE PREPARATION THEREOF filed in the names of R. O. James and J. E. Rieth, concurrently herewith.

BACKGROUND OF THE INVENTION

1. Field of the Invention

This invention relates to a novel dispersion of magnetic particles and, more specifically, to a dispersion of magnetic particles suitable for use in the preparation of photographic elements having a transparent magnetic recording layer.

2. Description of the Prior Art

Photographic elements containing transparent magnetic recording layers are described in U.S. Pat. No. 3,782,947 to Krall and U.S. Pat. No. 4,279,945 to Audran et al. These patents teach that dispersions of the magnetic particles are prepared by milling or otherwise dispersing magnetic particles in a composition including a transparent binder for the particles and a solvent for the binder. According to U.S. Pat. No. 4,279,945 the dispersing medium can also contain transparent addenda, for example, plasticizers or lubricants. A problem with such dispersions is that the magnetic particles have a tendency to agglomerate, forming clumps of non-uniform sizes. Such agglomerations of particles can cause light scattering and increase the optical density of the magnetic recording layer rendering it unsuitable for use in photographic elements.

SUMMARY OF THE INVENTION

We have discovered that magnetic dispersions featuring dialkyl esters of phthalic acid as the dispersing medium are particularly useful in preparing transparent magnetic recording layers which are free of unacceptable magnetic particle agglomeration and light scattering.

More particularly, in accordance with this invention, there is provided a dispersion consisting essentially of magnetic particles, a dialkyl ester of phthalic acid, and optionally, a dispersing agent.

It is an advantageous feature of this invention that the above-described dispersion is particularly useful as a precursor to a composition suitable for casting onto a cellulose acid ester support film to form a transparent magnetic recording layer for use in photographic elements.

It is another advantageous feature of this invention that the above-described dispersion can provide transparent magnetic recording layers which are free of unacceptable magnetic particle agglomerations and light scattering.

Yet another advantageous feature of this invention is that the photographic prints prepared from photographic elements containing such magnetic recording layers exhibit virtually no increase in graininess attributable to the magnetic recording layer.

DESCRIPTION OF THE PREFERRED EMBODIMENTS

The description which follows concerns usage of a magnetic dispersion including a dialkylester of phthalic acid in the preparation of a photographic element featuring a transparent magnetic recording layer. In addition, other transparent plasticizers, such as tricresyl phosphate, are believed to be useful dispersing media, and the dispersion is useful in other applications wherein transparent magnetic recording layers find utility.

The dispersion of this invention includes a dispersing medium. The dispersing medium preferably in a nonvolatile solvent which can be an ester of an acid such as phthalic acid. Preferred esters are dialkylesters of phthalic acid, the alkyl portion of which can contain from 1 to about 12, preferably 4 to 8, carbon atoms. Exemplary useful esters include dimethyl phthalate, diethyl phthalate, dipropyl phthalate, dibutyl phthalate, di-2-ethylhexyl phthalate, dioctyl phthalate and the like. The dialkylesters of phthalic acid are readily prepared and are advantageous compared to other esters of phthalic acid such as dimethoxy ethyl phthalate which has been prepared using hazardous solvents such as methyl cellosolve. The dispersing medium can be present in the dispersion during milling in an amount of about 40–70%, more preferably 50–65%, by weight. All percentages herein, unless otherwise indicated, refer to percentages by weight based on the total weight of the dispersion.

The dispersion in accordance with this invention contains magnetic particles which preferably are acicular or needle like magnetic particles. The average length of these particles along the major axis preferably is less than about 0.3, more preferably, less than about 0.2 micron. The particles preferably exhibit an axial ratio, that is, a length to diameter thickness ratio of up to about 5 or 6 to 1. Preferred particles have a specific surface area of at least 30 $m^2/g$, more preferably of at least 40 $m^2/g$. Typical acicular particles of this type include, for example, particles of ferro- and ferri-magnetic iron oxides such as $\gamma$-ferric oxide, complex oxides of iron and cobalt, various ferrites and metallic iron pigments. Alternatively, small tabular particles such as barium ferrites and the like can be employed. The particles can be doped with one or more ions of a polyvalent metal such as titanium, tin, cobalt, nickel, zinc, manganese, chromium, or the like as is known in the art. A preferred particle consists of Co surface treated $\gamma$-$Fe_2O_3$ having a specific surface area of greater than 40 $m^2/g$. Particles of this type are commercially available and can be obtained from Toda Kogyo Corporation under the trade names CSF 4085V2, CSF 4565V, CSF 4585V and CND 865V and are available on a production scale from Pfizer Pigments Inc. under the trade designations RPX-4392, RPX-5003, RPX-5026 and RPX-5012. For good magnetic recording, the magnetic particles preferably exhibit coercive force above about 500 Oe and saturation magnetization above 70 emu/g.

The magnetic particles can be present in the dispersion in an amount of from about 25% to 75% by weight. In particular preferred embodiments, the magnetic particles are present in an amount of 30% to 50% by weight.

A dispersing agent, sometimes referred to as a wetting agent or a surface active agent, can be present in the dispersion to facilitate dispersion of the magnetic particles and/or wetting of the particles with the dispersing medium. This helps to further minimize agglomeration of the magnetic particles. The dispersing agent can be present in the dispersion in an amount up to about 10%, preferably 1–5%, by weight. Preferred amounts of the dispersing agent have been determined to be about 1.0–1.2% weight per 10 $m^2$/gm of surface area of the magnetic particles present. Useful dispersing agents include a fatty acid amine, and commercially available wetting agents such as Witco Emcol CC59 which is quaternary amine available from Witco Chemical Corp. Gafac PE 510, Gafac RE 610, Gafac RE 960, and Gafac LO 529 which are phosphoric acid esters available from GAF Corp.

The dispersion described above can be prepared by procedures known to those in the dispersion art. The dispersion can be prepared by the use of a dispersing machine, for example, a ball mill, a roll mill, a high speed impeller mill an attritor or a sand mill. The preferred procedures are illustrated in the examples which follow.

In practice, the above-described dispersion preferably is diluted with a binder, such as cellulose acetate, in a suitable solvent, which preferably is non-polar, such as methylene chloride to form a composition suitable for casting. The casting composition includes one or more suitable binders. The binder preferably is transparent. The preferred binder is a cellulose organic acid ester such as cellulose acetate. Other binders expected to be useful herein include cellulose diacetate, cellulose triacetate, cellulose acetate butyrate, cellulose nitrate, and cellulose acetate propionate. The casting composition can include one or more suitable solvents such as acetone, methyl ethyl ketone, methyl isobutyl ketone, ethyl acetate, butyl acetate, cyclohexanone, butyl alcohol, dimethylformamide and the like and mixtures thereof.

The casting composition can also contain plasticizers, such as tricresyl phosphate, lubricants, such as carbonic acid mixed esters such as ethyl cetyl phosphate, stripping aids, and the like.

Alternatively, the dispersion can be diluted with any suitable binder to form a coating composition which can be coated on any suitable support to form a magnetic recording element.

Another advantage of this invention is that worker exposure to organic vapors is minimized during manufacturing and handling. The above-described media minimize any change in dispersion concentration on handling and storage and helps ensure that the dispersion is coated in the precise amount each time it is used.

The following examples further illustrate the invention.

EXAMPLE 1

| Dispersion Ingredients | Weight Percent | g |
|---|---|---|
| Magnetic particle Toda CSF-4085V2 | 45.0 | 4500 |
| Dispersing Agent Gafac PE-510 (GAF Corp.) | 2.25 | 225 |
| Dispersing Medium dibutyl phthalate | 52.75 | 5275 |

The above ingredients were blended in a temperature controlled jacketed vessel and mixed together with a high speed disperser and the appropriately sized Cowles type dispersion blade at a tangential blade speed of 4000 feet per minute for 120 minutes. The blade diameter is selected so it is about ⅓ the mixing vessel diameter. The blade was positioned in the mixing vessel so that it was about 1 blade diameter from the bottom of the vessel. The water jacket temperature was held at 25° C. Once a consistent dispersion was achieved free of excessively large particle aggregates, the dispersion was processed in a sand mill, a horizontal media mill of the peg-type design. The grinding media was 1 millimeter zirconium silicate spheres. The grinding chamber volume was 2.48 liter and 2.1 liters of grinding media was added to the grinding zone. The shaft speed was maintained at a tangential speed of 1800 feet per minute. The grinding chamber is water jacketed to 10° C. to control the product temperature. The premix is pumped through the grinding chamber 8 consecutive times so that the total residence time of the premix in the grinding zone is 25–30 minutes. Dispersions prepared in this fashion exhibit excellent colloidal stability on aging and do not contribute to the image grain of films coated with low levels of this particle.

EXAMPLE 2

| Dispersion Ingredients | |
|---|---|
| Magentic particle surface treated Co-γ-$Fe_2O_3$ (Ca40 $m^2$/g) | 500 g |
| Dispersing agent GAFAC PE-510 | 25 g |
| Dispersing medium dibutyl phthalate | 975 g |

The above ingredients were milled in a 250 cc small media mill with continuous recirculation of the dispersion through a 2 litre capacity reservoir using steel balls as the grinding media for 6 hrs.

A similar dispersion may be diluted with cellulose triacetate solution to the following composition using a high shear mixer for the dilution procedure.

| Casting Composition | |
|---|---|
| Ingredients | Weight Percent |
| Methylene chloride | 83.0 |
| Methanol | 6.175 |
| Butanol | 2.8 |
| Cellulose triacetate | 6.5 |
| Dibutyl phthalate | 1.0 |
| GAFAC PE-510 | 0.025 |
| Co-γ-$Fe_2O_3$ | 0.5 |

This dispersion was coated on cellulose acetate base such that the pigment laydown was from 2 mg/1000 $cm^2$ to 10 mg/1000 $cm^2$ to form a thin (about 1 μm) layer of cellulose acetate containing uniformly dispersed magnetic particles. At these levels of pigment coded information can be written and read from the magnetic layers by use of suitable write/playback heads.

In addition to the magnetic pigments various dyes including magenta and blue may also be formulated into the pigmented layer to give neutral density films for the purpose of making reversal (color slide) films.

Another advantage of the magnetic pigment was the reduction of light piping from the exposed ends, sides or perforations in the film.

The invention has been described in detail with particular reference to preferred embodiments thereof, but it will be understood that variations and modifications can be effected within the spirit and scope of the invention.

What is claimed is:

1. A dispersion consisting essentially of magnetic particles, a dialkylester of phthalic acid, and a dispersing agent "said dialkylester being present in the amount of between 25 and 75% by weight and said dispersing agent being present up to 10% by weight with the balance being magnetic particles."

2. The dispersion of claim 1, wherein the alkyl portion of said dialkylester contains from 4 to 8 carbon atoms.

3. The dispersion of claim 1, wherein said ester is dibutylphthalate.

4. The dispersion of claim 1, wherein said magnetic particles consist of cobalt surface treated $\gamma$-$Fe_2O_3$ particles.

5. The dispersion of claim 1, wherein said magnetic particles have an average length of less than about 0.3 micron.

6. The dispersion of claim 1, wherein said dispersing agent is a phosphoric acid ester.

7. The dispersion consisting essentially of magnetic particles and a dialkyl ester of phthalic acid "said dialkylester being present in the amount of between 25 and 75% by weight and the balance being magnetic particles".

* * * * *